United States Patent
Satish et al.

(10) Patent No.: US 9,571,509 B1
(45) Date of Patent: Feb. 14, 2017

(54) SYSTEMS AND METHODS FOR IDENTIFYING VARIANTS OF SAMPLES BASED ON SIMILARITY ANALYSIS

(71) Applicant: Symantec Corporation, Mountain View, CA (US)

(72) Inventors: Sourabh Satish, Fremont, CA (US); Himanshu Dubey, Gwalior (IN); Vipul Sawant, Pune (IN)

(73) Assignee: Symantec Corporation, Mountain View, CA (US)

( * ) Notice: Subject to any disclaimer, the term of this patent is extended or adjusted under 35 U.S.C. 154(b) by 70 days.

(21) Appl. No.: 14/315,321

(22) Filed: Jun. 25, 2014

Related U.S. Application Data

(60) Provisional application No. 61/989,790, filed on May 7, 2014.

(51) Int. Cl.
*H04L 29/06* (2006.01)
*G06F 17/30* (2006.01)
*G06F 21/51* (2013.01)

(52) U.S. Cl.
CPC ..... *H04L 63/1416* (2013.01); *G06F 17/30595* (2013.01); *H04L 63/20* (2013.01); *G06F 21/51* (2013.01)

(58) Field of Classification Search
CPC .......... G06F 21/51–21/52; G06F 21/55–21/56; H04L 63/20
See application file for complete search history.

(56) References Cited

U.S. PATENT DOCUMENTS

| | | | |
|---|---|---|---|
| 5,956,729 | A | 9/1999 | Goetz et al. |
| 7,840,663 | B1 | 11/2010 | Hinchliffe et al. |
| 8,365,283 | B1 | 1/2013 | Satish et al. |
| 8,621,625 | B1 | 12/2013 | Bogorad et al. |
| 8,806,644 | B1 | 8/2014 | McCorkendale et al. |
| 9,152,694 | B1 | 10/2015 | Padidar et al. |

(Continued)

OTHER PUBLICATIONS

Sourabh Satish, et al; Systems and Methods for Analyzing Malware Samples and Assigning File Reputations; U.S. Appl. No. 61/989,790, filed May 7, 2014.

(Continued)

*Primary Examiner* — Ali Abyaneh
*Assistant Examiner* — Shaqueal Wade
(74) *Attorney, Agent, or Firm* — FisherBroyles LLP

(57) ABSTRACT

A computer-implemented method for identifying variants of samples based on similarity analysis may include (1) collecting, from security agents on endpoint computing systems, metadata attributes that describe samples identified by the security agents over an initial period of time, (2) collecting metadata attributes that describe a current sample identified after the initial period of time, (3) comparing at least two of the metadata attributes that describe the current sample with corresponding metadata attributes of the samples identified over the initial period of time, (4) designating the current sample as related to another sample from the samples identified over the initial period of time based on the comparison of the two metadata attributes, and (5) performing a security action to protect a user from malware based on the designation of the current sample as related to the other sample. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0079379 | A1 | 4/2007 | Sprosts et al. |
| 2007/0136292 | A1* | 6/2007 | Ohara ................. G06F 21/6209 |
| 2007/0256127 | A1 | 11/2007 | Kraemer et al. |
| 2008/0228814 | A1 | 9/2008 | Raley et al. |
| 2009/0044024 | A1 | 2/2009 | Oberheide et al. |
| 2009/0075592 | A1 | 3/2009 | Nystrom et al. |
| 2011/0219449 | A1* | 9/2011 | St. Neitzel .............. G06F 11/00 726/23 |
| 2012/0159260 | A1 | 6/2012 | Fortune et al. |
| 2012/0210428 | A1* | 8/2012 | Blackwell ........... G06F 11/3006 726/23 |
| 2012/0240236 | A1* | 9/2012 | Wyatt ................... G06F 21/564 726/25 |
| 2012/0266157 | A1 | 10/2012 | Mun et al. |
| 2012/0317609 | A1 | 12/2012 | Carrara et al. |
| 2013/0117848 | A1 | 5/2013 | Golshan et al. |
| 2015/0220734 | A1 | 8/2015 | Nalluri et al. |
| 2015/0261653 | A1* | 9/2015 | Lachambre ......... G06F 11/3616 717/126 |

OTHER PUBLICATIONS

Sourabh Satish; Systems and Methods for Identifying Malicious Files; U.S. Appl. No. 14/301,985, filed Jun. 11, 2014.

Andrew Collingwood Watson, et al; Systems and Methods for Analyzing Suspected Malware; U.S. Appl. No. 14/314,033, filed Jun. 25, 2014.

Sourabh Satish; Systems and Methods for Analyzing Malware Samples; U.S. Appl. No. 14/314,031, filed Jun. 25, 2014.

Sourabh Satish; Systems and Methods for Detecting Misplaced Applications Using Functional Categories; U.S. Appl. No. 14/315,312, filed Jun. 25, 2014.

"Application software", http://en.wikipedia.org/wiki/Application_software, as accessed Apr. 24, 2014, Wikipedia, (May 8, 2004).

"Advanced Threat Report 2013", FireEye, Inc., https://www2.fireeye.com/ppc-advanced-threat-report-2013-uk.html, as accessed Apr. 24, 2014, (2013).

"Palo Alto Networks", https://www.paloaltonetworks.com/, as accessed Apr. 24, 2014, (Oct. 18, 2000).

"FireEye, Inc.", http://www.fireeye.com/, as accessed May 6, 2014, (Oct. 12, 1999).

Dark Reading, "Automated Malware Analysis Under Attack", http://www.darkreading.com/vulnerabilities—threats/automated-malware-analysis-under-attack/d/d-id/1138904?, as accessed May 14, 2014, (Dec. 20, 2012).

Zeltser, Lenny "5 Steps to Building a Malware Analysis Toolkit Using Free Tools", http://zeltser.com/malware-analysis-toolkit/, as accessed May 14, 2014, (1995).

Shinotsuka, Hiroshi "Malware Authors Using New Techniques to Evade Automated Threat Analysis Systems", http://www.symantec.com/connect/blogs/malware-authors-using-new-techniques-evade-automated-threat-analysis-systems, as accessed May 14, 2014, Security Response Blog, Symantec,(Oct. 26, 2012).

"Cuckoo Sandbox", http://www.cuckoosandbox.org/, as accessed May 14, 2014, (2010).

L33T, "Setup Automated Malware Analysis—Cuckoo Sandbox on Bt-3", http://www.securitytube.net/video/6653, as accessed May 14, 2014, (Jan. 14, 2013).

"Blue Coat", https://www.bluecoat.com/, as accessed May 14, 2014, (Mar. 24, 2002).

Sourabh Satish; Identifying Misuse of Legitimate Objects; U.S. Appl. No. 13/940,106, filed Jul. 11, 2013.

Dark Reading, "Automated Malware Analysis Under Attack", http://www.darkreading.com/advanced-threats/automated-malware-analysis-under-attack/240145167, as accessed May 14, 2014, (Dec. 20, 2012).

"Gartner Magic Quadrant for Endpoint Protection Platforms", http://www.mcafee.com/us/independent-reports/gartner-mq-endpoint-protection-platforms.aspx, as accessed May 14, 2014, McAfee, Inc., (May 6, 2013).

"Next Generation Detection—Dynamic Malware Analysis Service", http://www.proofpoint.com/products/targeted-attack-protection/next-generation-detection.php, as accessed May 14, 2014, Proofpoint, Inc., (on or before May 14, 2014).

* cited by examiner

SYSTEMS AND METHODS FOR IDENTIFYING VARIANTS OF SAMPLES BASED ON SIMILARITY ANALYSIS

CROSS REFERENCE TO RELATED APPLICATION

This application claims priority to provisional U.S. Application No. 61/989,790, filed 7 May 2014, the disclosure of which is incorporated, in its entirety, by this reference.

BACKGROUND

Individuals and organizations seek to protect their computing resources from attackers and malicious software. To achieve that goal, security vendors may attempt to identify software and categorize the software as malicious. These security vendors may index the different samples of software according to unique identifying features, such as hashes.

Unfortunately, attackers have responded to these security features by modifying the software, through polymorphism, in a manner that avoids detection (e.g., alters the hash), while preserving the software's malicious functionality. The security vendors may attempt to keep up with these modifications by manually coding each detected variant as malware. Nevertheless, the attempts by security vendors to manually code each detected variant as malware is inefficient, not comprehensive, and prone to human error. Accordingly, the instant disclosure identifies and addresses a need for additional and improved systems and methods for identifying variants of samples based on similarity analysis.

SUMMARY

As will be described in greater detail below, the instant disclosure generally relates to systems and methods for identifying variants of samples based on similarity analysis. The systems and methods may identify variants by, for example, automatically (A) collecting a predefined set of samples and (B) systematically comparing a current sample with those in the predefined set to identify related samples and corresponding modifications.

In one example, a computer-implemented method for identifying variants of samples based on similarity analysis may include (1) collecting, from security agents on endpoint computing systems, metadata attributes that describe samples identified by the security agents over an initial period of time, (2) collecting, from the same or different security agents on endpoint computing systems, metadata attributes that describe a current sample identified after the initial period of time, (3) comparing at least two of the metadata attributes that describe the current sample with corresponding metadata attributes of the samples identified over the initial period of time, (4) designating the current sample as related to another sample from the samples identified over the initial period of time based on the comparison of the two metadata attributes, and (5) performing a security action to protect a user from malware based on the designation of the current sample as related to the other sample.

In some examples, designating the current sample as related to the other sample may include designating the other sample as the closest related sample to the current sample from among the samples collected over the initial period of time. In further examples, performing the security action may include applying a security policy to the current sample based on another security policy assigned to the other sample. In these examples, performing the security action may include creating the security policy as a copy of the other security policy.

In some examples, comparing the two metadata attributes may include correlating changes in the metadata attributes with changes in time. In further examples, collecting metadata attributes for the current sample may include calculating a hash that uniquely identifies the current sample.

In some examples, comparing the two metadata attributes may include iterating over the two metadata attributes to compare each metadata attribute in sequence. In these examples, comparing each metadata attribute may include calculating a degree of relatedness for the metadata attribute. Moreover, comparing the two metadata attributes may include calculating an overall degree of relatedness between the current sample and the other sample based on underlying degrees of relatedness between metadata attributes. As a last example, designating the current sample as related to the other sample may include determining that a degree of relatedness between the current sample and the other sample satisfies a similarity threshold.

In one embodiment, a system for implementing the above-described method may include (1) a collection module, stored in memory, that (A) collects, from security agents on endpoint computing systems, metadata attributes that describe samples identified by the security agents over an initial period of time and (B) collects, from the same or different security agents on endpoint computing systems, metadata attributes that describe a current sample identified after the initial period of time, (2) a comparison module, stored in memory, that compares at least two of the metadata attributes that describe the current sample with corresponding metadata attributes of the samples identified over the initial period of time, (3) a designation module, stored in memory, that designates the current sample as related to another sample from the samples identified over the initial period of time based on the comparison of the two metadata attributes, (4) a performance module, stored in memory, that performs a security action to protect a user from malware based on the designation of the current sample as related to the other sample, and (5) at least one physical processor configured to execute the collection module, the comparison module, the designation module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) collect, from security agents on endpoint computing systems, metadata attributes that describe samples identified by the security agents over an initial period of time, (2) collect, from the same or different security agents on endpoint computing systems, metadata attributes that describe a current sample identified after the initial period of time, (3) compare at least two of the metadata attributes that describe the current sample with corresponding metadata attributes of the samples identified over the initial period of time, (4) designate the current sample as related to another sample from the samples identified over the initial period of time based on the comparison of the two metadata attributes, and (5) perform a security action to protect a user from malware based on the designation of the current sample as related to the other sample.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
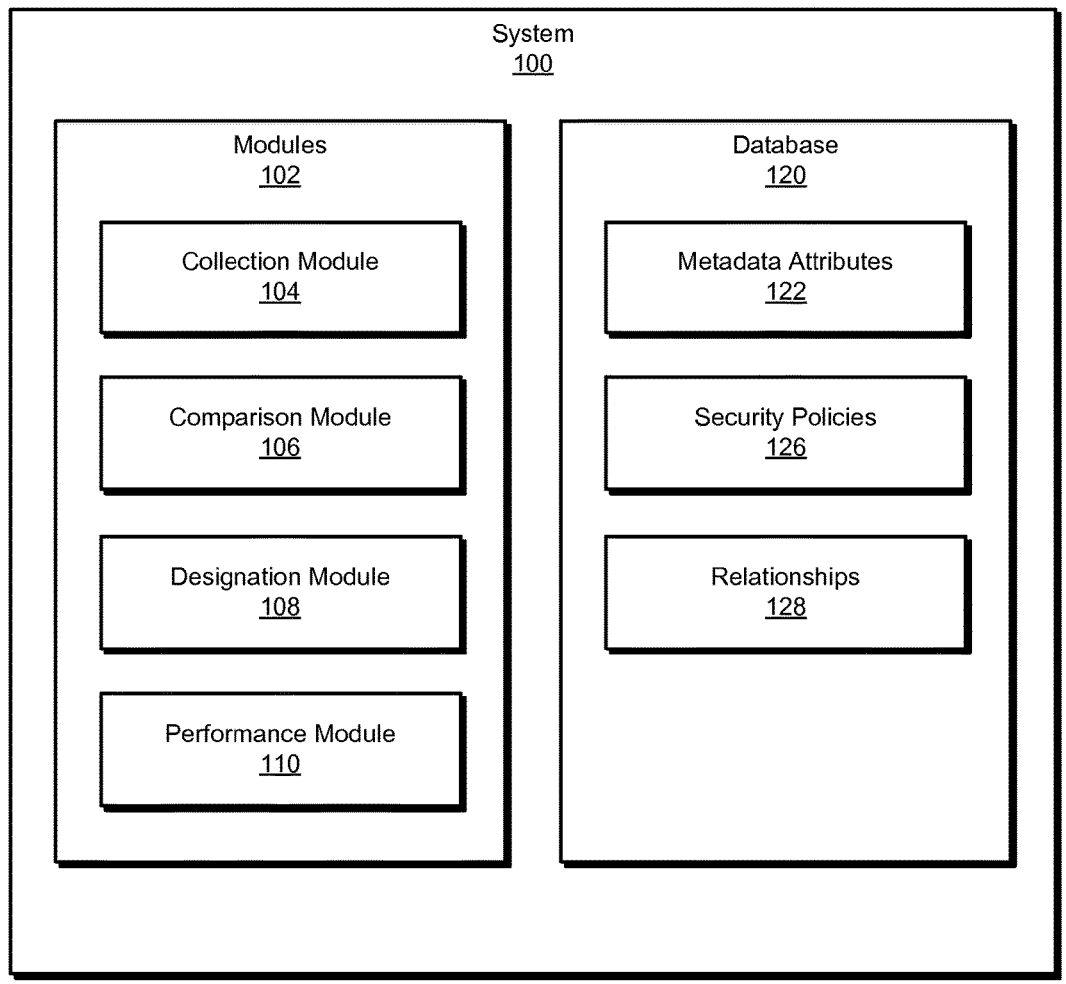
FIG. 1 is a block diagram of an exemplary system for identifying variants of samples based on similarity analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying variants of samples based on similarity analysis. As will be explained in greater detail below, the disclosed systems and methods may automatically perform similarity analysis on detected samples, thereby achieving greater efficiency, accuracy, depth, and comprehensiveness in comparison to traditional manual methods. For example, the disclosed systems and methods may detect greater numbers of related samples, detect more subtle and/or distant relationships between samples, and/or avoid human error in detecting relationships and variations between samples.

Figure 2:
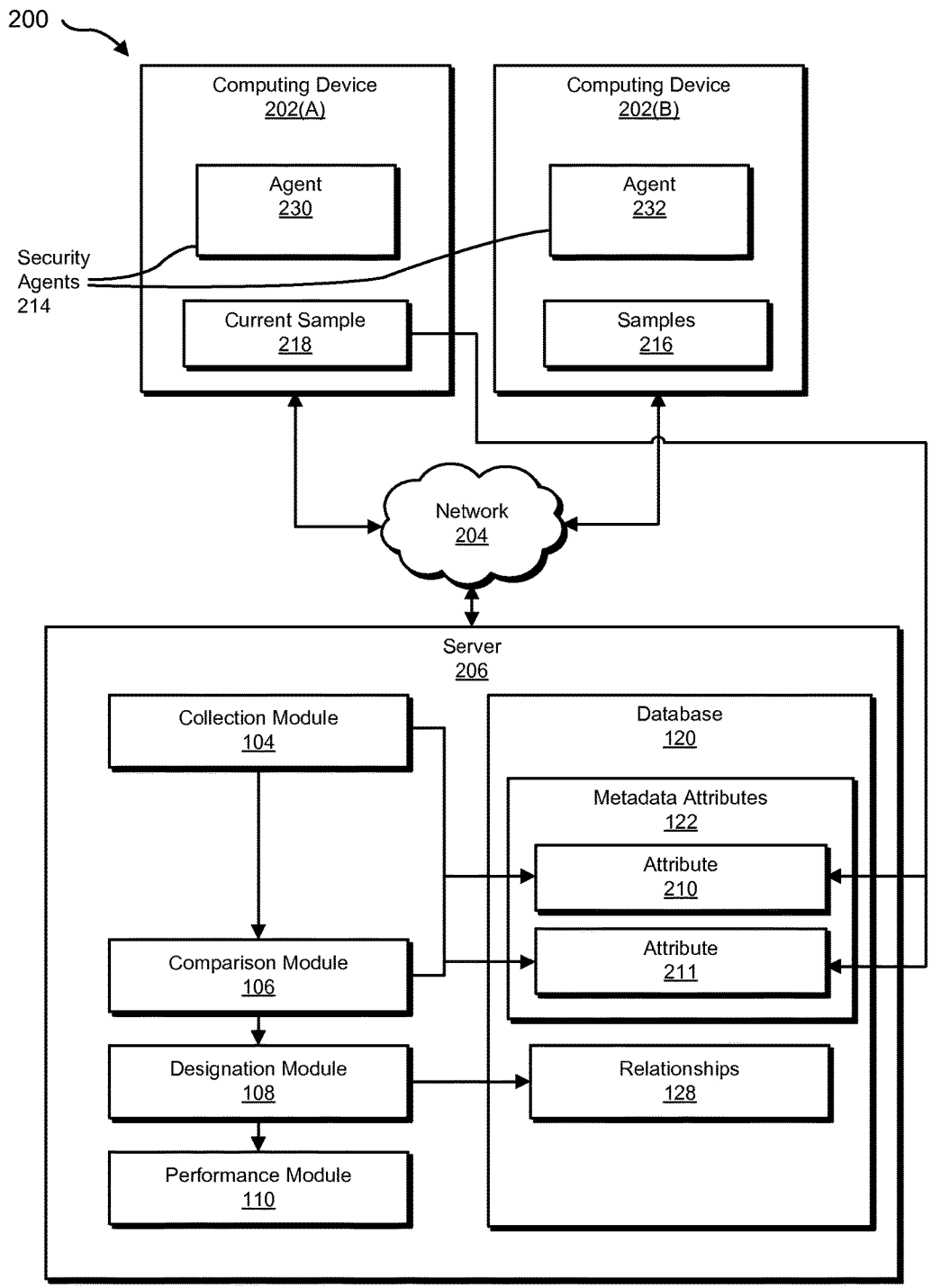
FIG. 2 is a block diagram of an additional exemplary system for identifying variants of samples based on similarity analysis.

The following will provide, with reference to FIGS. 1-2, detailed descriptions of exemplary systems for identifying variants of samples based on similarity analysis. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for identifying variants of samples based on similarity analysis. As illustrated in this figure, exemplary system 100 may include one or more modules 102 for performing one or more tasks. For example, and as will be explained in greater detail below, exemplary system 100 may also include a collection module 104 that may collect, from security agents on endpoint computing systems, metadata attributes that describe samples identified by the security agents over an initial period of time. Collection module 104 may similarly collect, from the same or different security agents on endpoint computing systems, metadata attributes that describe a current sample identified after the initial period of time.

Exemplary system 100 may additionally include a comparison module 106 that may compare at least two of the metadata attributes that describe the current sample with corresponding metadata attributes of the samples identified over the initial period of time. Exemplary system 100 may also include a designation module 108 that may designate the current sample as related to another sample from the samples identified over the initial period of time based on the comparison of the two metadata attributes.

Moreover, exemplary system 100 may include a performance module 110 that may perform a security action to protect a user from malware based on the designation of the current sample as related to the other sample. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, such as computing device 202(A) and 202(B), and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store metadata attributes 122, which may include any metadata for corresponding samples, as discussed further below. Examples of metadata attributes 122 for a sample may include a threat detection name or signature name (e.g., that triggered identification of the sample), file name, file system path, file creator, download UNIFORM RESOURCE LOCATOR ("URL"), behaviors and/or categories of behaviors performed by the sample, files and/or child samples created by the corresponding sample, file section names, imported application programming interfaces (APIs), a process that launched the sample, processes launched by the sample, and/or attributes of network connections used by the sample (e.g., INTERNET PROTOCOL address and/or accessed URL, network port, and/or network protocol, etc.).

Database 120 may also be configured to store security policies 126, which may define settings and features for protecting users from security threats (e.g., specific reactions in response to detecting specific threats). Various ones of security policies 126 may be associated with various samples known to constitute malware, as discussed further below.

Lastly, database 120 may also be configured to store relationships 128, which may define relationships between various samples and sample variants. For example, relationships 128 may specify binary relationships (related or not related), degrees of relatedness (e.g., a value of 0.8 represents more relatedness than a value of 0.2), differences between samples, estimated times when modifications were made to create one sample from another, and/or network relationships indicating a series of two or more changes from an originating sample to generate further samples.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to identify variants of samples based on similarity analysis. For example, and as will be described in greater detail below, collection module 104 may collect, from security agents 214 (including an agent 230 and an agent 232) on endpoint computing systems, such as computing device 202(A) and computing device 202(B), metadata attributes 122 that describe samples 216 identified by security agents 214 over an initial period of time. Collection module 104 may also collect, from the same or different security agents 214 on endpoint computing systems, metadata attributes that describe a current sample 218 identified after the initial period of time. Moreover, comparison module 106 may compare at least two of metadata attributes 122, such as attribute 210 and an attribute 211, that describe current sample 218 with corresponding metadata attributes 122 of samples 216 identified over an initial period of time. Designation module 108 may designate current sample 218 as related to another sample from samples 216 identified over the initial period of time based on the comparison of the two metadata attributes. Performance module 110 may also perform a security action to protect a user from malware based on the designation of current sample 218 as related to the other sample.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of collecting metadata attributes about samples, comparing metadata attributes, and/or taking or directing remedial action in response to identifying samples as related. Examples of server 206 include, without limitation, application servers and database servers configured to provide various database services and/or run certain software applications. Notably, any permutation of module 102 may be located entirely in an instance of computing device 202, entirely in server 206, in some mixture of these two, and/or entirely or partially in a proxy or other computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
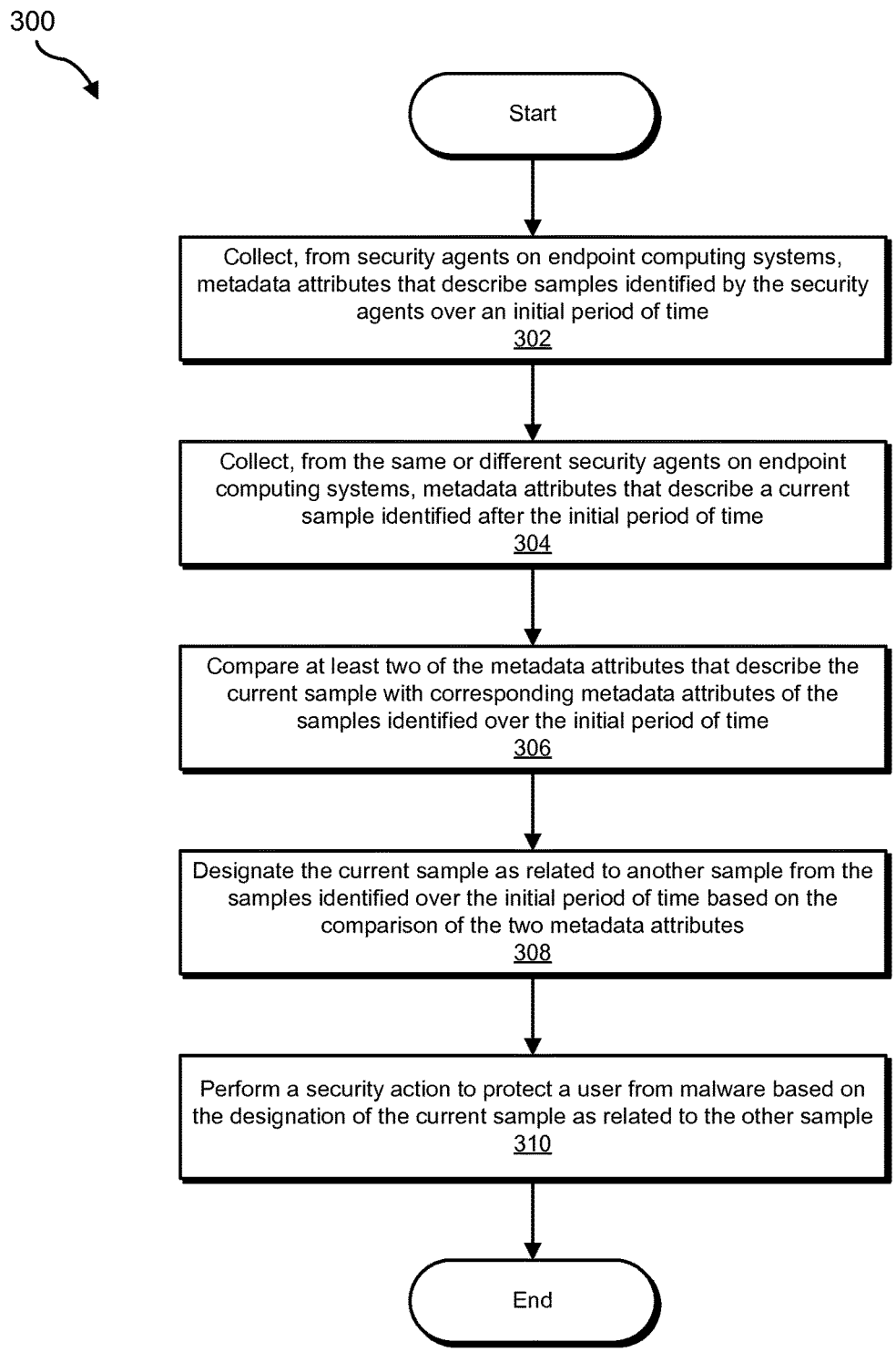
FIG. 3 is a flow diagram of an exemplary method for identifying variants of samples based on similarity analysis.

FIG. 3 is a flow diagram of an exemplary computer-implemented method 300 for identifying variants of samples based on similarity analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may collect, from security agents on endpoint computing systems, metadata attributes that describe samples identified by the security agents over an initial period of time. For example, at step 302 collection module 104 may, as part of server 206 in FIG. 2, collect, from security agents 214 on endpoint computing systems, metadata attributes 122 that describe samples 216 identified by security agents 214 over the initial period of time.

As used herein, the term "metadata attributes" generally refers to any metadata within, or external, to a sample that describes features of the sample or otherwise provides information about the sample. Examples of metadata attributes include all of the examples discussed above for database 120.

Moreover, the term "security agents," as used herein, generally refers to any software program, agent, script, routine, macro, and/or routine that protects users from security threats. Similarly, as used herein, the term "endpoint computing systems" refers to any computing systems susceptible to malware, computing systems that perform functions for users (whether the users are always present or not), and/or computing systems protected by security software provided by a security vendor.

Furthermore, as used herein, the phrase "samples," generally refers to items of data, files, programs, and/or applications that a security program may collect and/or analyze while monitoring for security threats. In some examples, samples may include executable files.

Collection module 104 may collect metadata attributes in a variety of ways. For example, collection module 104 may automatically receive metadata attributes, and/or identifiers of metadata attributes, from the security agents. In other examples, collection module 104 may request metadata attributes (e.g., any newly identified metadata attributes) by sending a request to the security agents. In some examples, the security agents at the endpoint computing systems may (A) automatically detect samples, (B) extract metadata attributes, and/or (C) report the metadata attributes to collection module 104. The security agents may perform features (A), (B), and (C) according to any schedule and/or interval, which may be the same or different for each feature. For example, the security agents may monitor to detect samples when they arrive, are saved, are executed, and/or are installed on the endpoint computing systems. The security agents may similarly intercept and/or detect sample activity when the activity occurs (e.g., through a file-system driver) and/or scan for samples (e.g., continuously or according to a schedule). The security agents may subsequently extract the metadata attributes and report them to collection module 104, which may be located at a backend security server. Specifically, the security agents may extract, detect, and/or identify any permutation of the metadata attributes discussed above for database 120.

Figure 4:
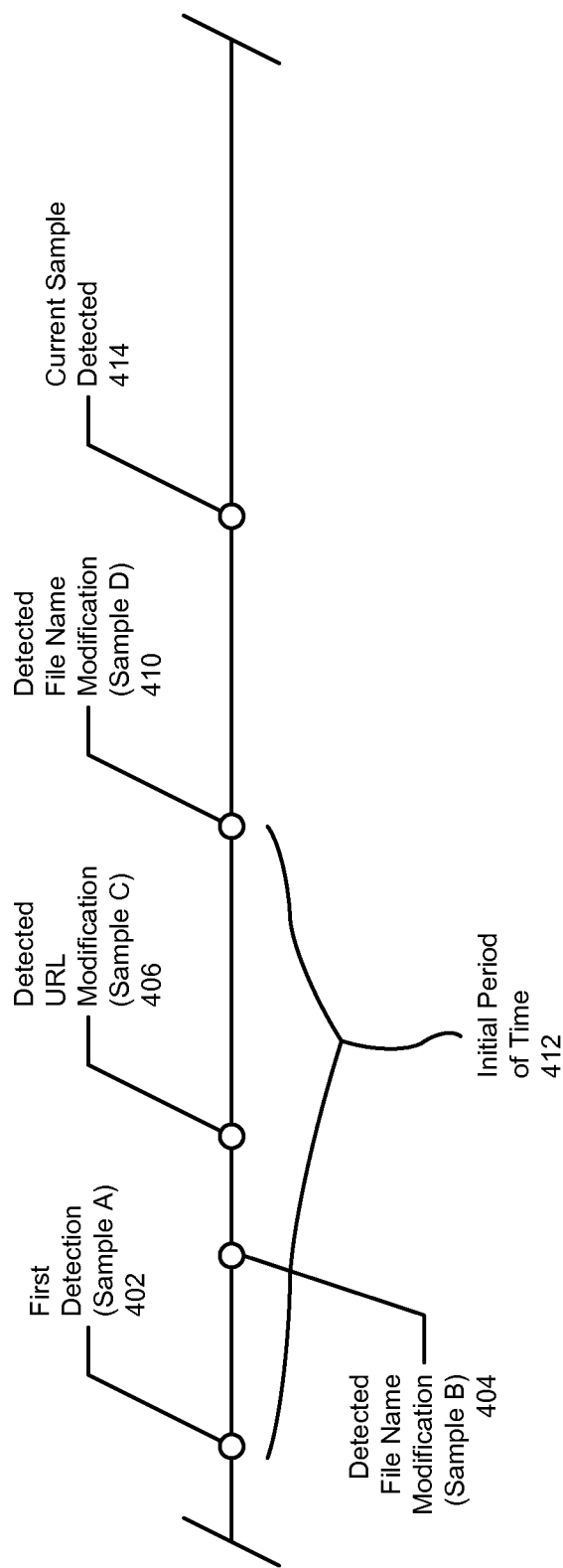
FIG. 4 is a block diagram of an exemplary timeline related to system and methods for identifying variants of samples based on similarity analysis.

FIG. 4 shows an exemplary timeline for collecting metadata attributes about collected samples. At step 402, collection module 104 or another module may first detect a sample (sample A). Later, at step 404, collection module 104 or another module may similarly detect another sample (sample B). Sample A and sample B may be variants such that the only detected difference between them is a change in file name. Similarly, at step 406, collection module 104 or another module may detect another sample (sample C), which may indicate a further change in download URL. Next, at step 410, collection module 104 or another module may detect another variant (sample D), which may indicate a further change in file name. Steps 402, 404, 406, and 410 may occur over an initial period of time 412, as discussed above. In general, initial period of time 412 may refer to any period of time (A) during which the previous samples were identified and (B) prior to identification of the current sample. Lastly, at step 414, collection module 104 or another module may detect a fifth sample, the current sample, which may be identical to sample D, as discussed further below.

At step 304 one or more of the systems described herein may collect, from the same or different security agents on endpoint computing systems, metadata attributes that describe a current sample identified after the initial period of time. For example, at step 304 collection module 104 may, as part of server 206 in FIG. 2, collect, from the same or different security agents 214 on endpoint computing systems, metadata attributes that describe current sample 218 identified after the initial period of time.

As used herein, the term "current sample" generally refers to a sample that a security system, such as system 100, processes and/or analyzes for categorization, detection of security threats, and/or application of a security policy. For example, system 100 may analyze the current sample by comparing various metadata attributes of the current sample with those of other previously-collected samples, as discussed further below.

Collection module 104 may collect metadata attributes for the current sample in a variety of ways. In general, collection module 104 may perform step 304 in a manner parallel to step 302. Thus, collection module 104 may generally collect metadata attributes for the current sample in any manner that parallels how collection module 104 collects metadata for the previous samples collected over the initial period of time. The collected metadata attributes may include any permutation of the same metadata attributes discussed above for database 120 and step 302.

In general, the "current sample" may simply correspond to a sample that has entered a stage for analysis, categorization, identification, and/or processing by a security system, such as system 100. The security system may process various samples in series and/or in parallel. Upon entering the stage for processing, the security system may attempt to identify how the current sample relates to other samples by performing similarity analysis on metadata attributes, as discussed below.

In some examples, collection module 104 may collect metadata attributes for the current sample by calculating a fingerprint, such as a hash, that uniquely identifies the current sample. Collection module 104 may similarly calculate a fingerprint for any portion or entirety of any sample. For example, collection module 104 may calculate a fingerprint for any portion of a sample that excludes one or more varying internal items of metadata, enabling system 100 to match the same fingerprint to different samples having different metadata attributes. The fingerprint may provide a more compact and less storage intensive identifier that uniquely identifies the sample without storing the entire sample. Collection module 104 may store the fingerprint in database 120 in association with metadata attributes for the current sample, thereby designating their relationship within database 120.

At step 306 one or more of the systems described herein may compare at least two of the metadata attributes that describe the current sample with corresponding metadata attributes of the samples identified over the initial period of time. For example, at step 306 comparison module 106 may, as part of server 206 in FIG. 2, compare at least two of metadata attributes that describe current sample 218 with corresponding metadata attributes 122 of samples 216 identified over initial period of time 412.

Comparison module 106 may compare the two metadata attributes in a variety of ways. In some examples, comparison module 106 may perform a two stage method of comparison. In a first stage, comparison module 106 may scan the samples identified over the initial period of time for those having an identical match on one or both of the metadata attributes. In a second stage, comparison module 106 may scan the remaining samples for those samples that do not exactly match on one or both of the metadata attributes, but which satisfy a similarity threshold. For example, the file name of the current sample (e.g., "file.exe") may not exactly match the file name of a previously detected sample (e.g., "file1.exe"), but nevertheless the file names may be similar enough to satisfy a threshold score according to a similarity analysis. In some examples, comparison module 106 may perform either or both stages of the two stage analysis using any permutation of metadata attributes collected for current sample and any permutation of previously collected samples. For example, comparison module 106 may perform, for each comparison between the current sample and another sample, either or both stages of the two stage analysis for all metadata attributes (A) that collection module 104 collected for both samples or (B) predefined by a formula or configuration specified by comparison module 106.

In some examples, comparison module 106 may compare the two metadata attributes by iterating over the two metadata attributes to compare each metadata attribute in sequence. Comparison module 106 may similarly iterate over any number of metadata attributes. If collection module 104 collected a metadata attribute for the current sample but not for another previous sample (or vice versa), then comparison module 106 may skip that comparison and/or may designate a result of the comparison as non-matching or unknown.

In general, comparison module 106 may compare metadata attributes in two loops. First, comparison module 106 may loop between different previous samples by comparing the two metadata attributes between the current sample and each of the different previous samples (e.g., every previous sample and/or each of a predefined set from the samples collected over the initial period of time). Second, for each of the different previous samples, comparison module 106 may iterate over the two (or more) metadata attributes, thereby comparing each metadata attribute individually, as discussed above. Comparison module 106 may perform both of these (nested) loops for each of the two stages of the two stage analysis, as also discussed above.

Moreover, although these two loops each imply a sequential series of individual comparison, comparison module 106 may perform each or both of these loops, in part or entirely, in parallel. Thus, comparison module 106 may compare the current sample with different previously-collected samples in parallel. Similarly, for each of these comparisons, comparison module 106 may similarly compare different metadata attributes in parallel. Although this discussion focuses on metadata attributes, comparison module 106 may additionally or alternatively compare samples themselves (e.g., compare their underlying content or data other than metadata).

Figure 5:
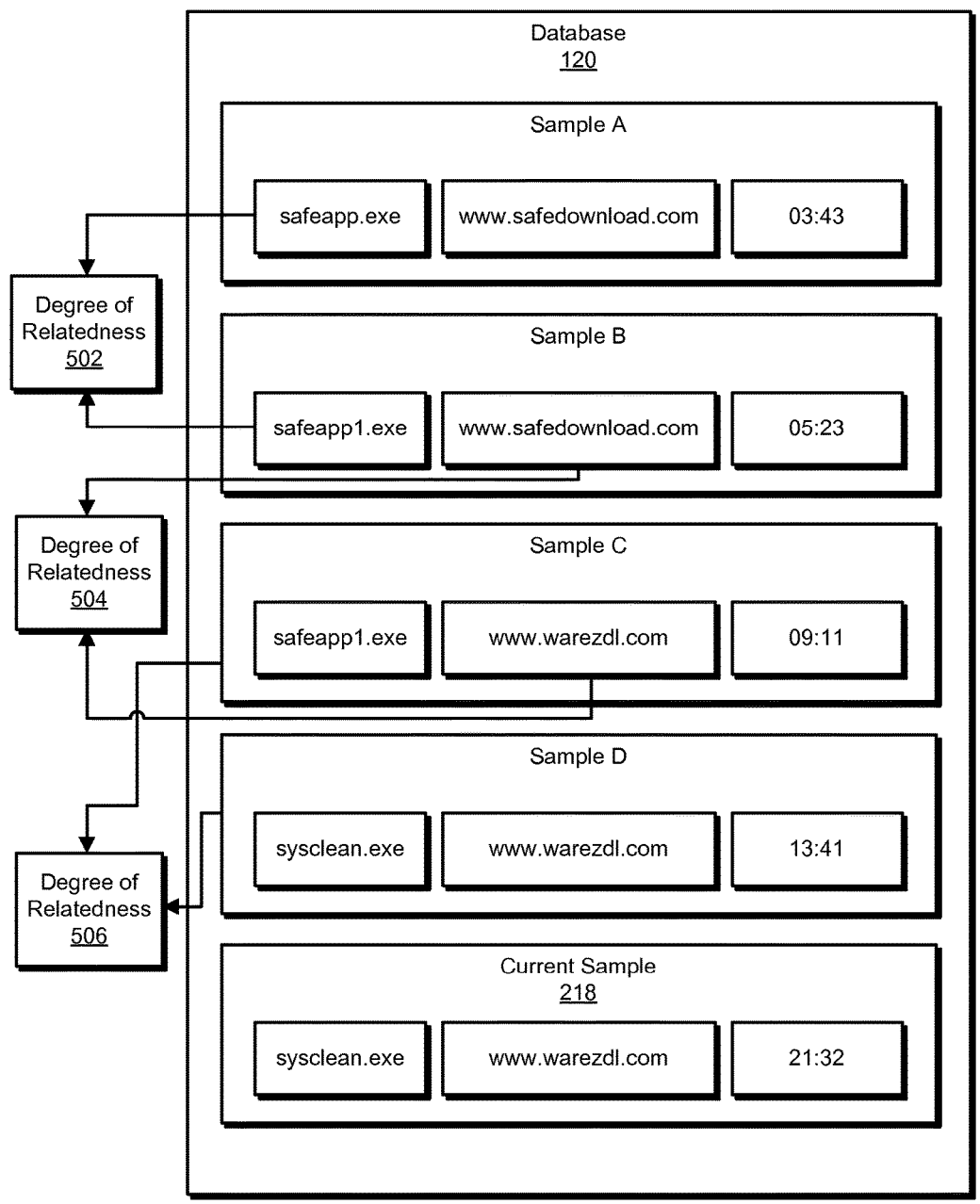
FIG. 5 is a block diagram of exemplary variants of samples on which the disclosed systems and methods may perform similarity analysis.

FIG. 5 shows an exemplary block diagram of metadata attributes for the samples from FIG. 4, as stored within database 120. As shown in FIG. 5, these metadata attributes may include metadata attributes for sample A, sample B, sample C, sample D, and current sample 218, as discussed above. Notably, sample A has a file name ("safeapp.exe"), a download URL ("www.safedownload.com"), and a recorded time of detection on an endpoint computing system (03:43 hours). FIG. 5 shows that sample B differs from sample A, as discussed above for FIG. 4, because sample B has a file name of "safeapp1.exe." Similarly, sample C differs from sample B, because sample C has a download URL of "www.warezdl.com." Moreover, sample D differs from sample C, because sample D indicates a further change in file name to "sysclean.exe." Lastly, current sample 218 has identical features to sample D, as discussed above.

The samples shown in FIG. 5 are merely exemplary and for illustration purposes. For example, the samples shown in FIG. 5 indicate a consecutive series of changes in time. In other words, sample D indicates changes from sample C, rather than indicating changes from sample A or sample B. In other examples, various samples may indicate changes in a networked, hub-and-spoke, and/or non-consecutive fashion, such that a later detected sample may indicate changes from an originating sample without also indicating changes shown in an intervening sample. In general, comparison module 106 and related modules may assume or infer that later detected samples that indicate the same change merely copied the same change from an earlier sample, rather than independently making the change, but this tentative assumption may not be true in every case. Comparison module 106 may infer that the simpler, shorter, more predictable, and/or more desirable the change, the more likely that the change was independently made (e.g., and alter a confidence value for this inference accordingly).

In some examples, comparison module 106 may compare each metadata attribute by calculating a degree of relatedness for the metadata attribute. For example, comparison module 106 may calculate a degree of relatedness 502 between the file names of sample A and sample B, as shown in FIG. 5. Similarly, comparison module 106 may calculate a degree of relatedness between download URLs for sample B and sample C, as also shown in FIG. 5. In general, comparison module 106 may calculate a degree of relatedness as a result of some or each attribute comparison that comparison module 106 performs. Comparison module 106 may generate the degree of relatedness as a number, symbol, value, and/or character along any suitable scale, such as a numerical score between zero (no relation) and one (total identity).

Comparison module 106 may compare different metadata attributes differently (e.g., according to different algorithms or formulas) depending on the specific attribute under comparison. For example, for alphanumeric metadata attributes, comparison module 106 may (A) count the number of the same characters, (B) count the number of same characters in the same position, (C) count the number of characters within an alphanumeric range of specified characters and/or within a specific range of character position within a character string, and/or (D) count a number of alphanumeric character increments and/or decrements, and/or character position shifts (or insertions and/or deletions), needed to repeat a specified character string, etc.

For example, to determine a degree of relatedness between the file name "safeapp.exe" and "safeapp1.exe," comparison module 106 may consider that each character is identical except that a "1" character is inserted to generate "safeapp1.exe." Comparison module 106 may similarly base the comparison on determining that, although the characters ".exe" may have different positions in the character strings (e.g., beginning on the left as an initial position), the insertion of "1" increased their position in the character string by one character. Comparison module 106 may thereby detect false positives in character position differences by factoring in insertions and deletions. Moreover, comparison module 106 may similarly perform the comparison by searching one character string for subsets of the other character string, such as all two-character strings, three-character strings, or all proper subsets.

Furthermore, comparison module 106 may also include string manipulation functions, such as changing capital letters to lower case letters (and vice versa) and reversing positions of characters, in considering operations to perform to generate one character string from another. In general, comparison module 106 may determine the minimum number of operations, from among a predefined set of character string operations (e.g., on characters, subsets of strings, and/or entire strings), needed to generate one string from another. Comparison module 106 may similarly weigh different operations and/or string positions more heavily than others when generating the degree of relatedness. Moreover, comparison module 106 may also use any conventional or previously-identified function or heuristic for calculating degrees of relatedness between strings and/or numerical values.

In other examples, comparison module 106 may generate variants of one character string and then determine whether any variant matches the other character string under comparison. For example, comparison module 106 may generate variants of "safeapp.exe" by inserting each potential character at every available position within the character string. That algorithm would generate numerous variants, including the matching "safeapp1.exe." Comparison module 106 may thereby determine that the file names are related. Comparison module 106 may similarly modulate degree of relatedness 502 based on the number of variants generated.

In some examples, comparison module 106 may compare the two metadata attributes by calculating an overall degree of relatedness between the current sample and the other sample based on underlying degrees of relatedness between metadata attributes. For example, comparison module 106 may calculate an underlying degree of relatedness between file names for sample D and sample C (similar to degree of relatedness 502 between sample B and sample A). Comparison module 106 may also calculate an underlying degree of relatedness between download URLs for sample D and sample C (similar to degree of relatedness 504 between sample C and sample B). Comparison module 106 may then calculate an overall degree of relatedness 506 between sample D and sample C based on those underlying degrees of relatedness. In calculating the overall degree of relatedness, comparison module 106 may weigh the underlying degrees of relatedness differently according to any algebraic formula or business logic, for example. Moreover, comparison module 106 may translate degrees of relatedness from one form to another to perform the overall comparison (e.g., converting a binary value, such as 1, to a float value, such as 1.0).

In some examples, comparison module 106 may compare the two metadata attributes by correlating changes in the metadata attributes with changes in time. For example, comparison module 106 may infer that the first detected instance of changed metadata correlates with when the change occurred, and that later instances of the changed metadata are merely copies and not independent changes. Comparison module 106 may similarly track the evolution of sample variants such that smaller changes are detected as occurring over proportionally smaller periods of time whereas larger changes are detected as occurring over proportionally larger periods of time.

At step 308 one or more of the systems described herein may designate the current sample as related to another sample from the samples identified over the initial period of time based on the comparison of the two metadata attributes. For example, at step 308 designation module 108 may, as part of server 206 in FIG. 2, designate current sample 218 as related to another sample from samples 216 identified over initial period of time 412 based on the comparison of the two metadata attributes.

Designation module 108 may designate the samples as related in a variety of ways. For example, designation module 108 may designate the samples as related if any metadata attribute, or predefined group of metadata attributes, are identical matches. Similarly, designation module 108 may designate the samples as related if the metadata attribute, or predefined group of metadata attributes, each satisfy a relatedness threshold (when compared with the corresponding calculated degree of relatedness, as discussed above). Additionally, or alternatively, designation module 108 may designate the samples as related if the overall degree of relatedness or similarity (e.g., 0.8) satisfies a relatedness threshold (e.g., 0.7).

In some examples, designation module 108 may designate the samples as related by identifying intervening variants. For example, designation module 108 may designate sample A and sample C as related based on a determination that both sample A and sample C are related (e.g., satisfy a relatedness threshold) with sample B. Designation module 108 may designate sample A and sample C as related even if these two samples do not directly satisfy a relatedness threshold, without consideration of intervening sample B. In general, designation module 108 may designate samples as related by marking or specifying their relationship, or degree of relatedness, in a database, record, file, and/or storage (e.g., as two items in a table).

In some examples, designation module 108, and/or comparison module 106, may (recursively) perform a search that begins with one sample, identifies a directly related sample or samples, and then uses those related samples as starting points from which to identify further related samples. Designation module 108 may thereby identify related samples that are directly, two-step, three-step, or any arbitrary number of steps removed from the original sample. Designation module 108 may modulate a degree of relatedness between the originating sample and another sample based on the number of hops or steps that designation module 108 took in identifying the indirect relationship (e.g., such that the degree of relatedness is proportional to the number of hops and/or such that greater number of hops indicate proportionally less relatedness). Designation module 108 may also terminate the search after reaching a specified number of steps or hops.

In some examples, designation module 108 may designate the current sample as related to the other sample by designating the other sample as the closest related sample to the current sample from among the samples collected over the initial period of time. For example, if designation module 108 identifies multiple related samples from among the samples collected over the initial period of time, designation module may rank order them according to their corresponding degrees of relatedness, as discussed above.

At step 310 one or more of the systems described herein may perform a security action to protect a user from malware based on the designation of the current sample as related to the other sample. For example, at step 310 performance module 110 may, as part of server 206 in FIG. 2, perform a security action to protect a user from malware based on the designation of current sample 218 as related to the other sample.

As used herein, the term "security action" generally refers to any action or remedial measure that a security system, such as system 100, may take to protect users from one or more security threats. Moreover, the term "malware," as used herein, generally refers to any software, code, script, routine, macro, and/or computer-readable object that performs a function not intended or desired by a user. Malware may harass users, degrade computer performance, infiltrate privacy measures, and/or surreptitiously record user data, for example.

Performance module 110 may perform the security action in a variety of ways. In some examples, performance module 110 may perform the security action by applying a security policy to the current sample based on another security policy assigned to the other sample. In other words, performance module 110 may infer that, because the other security policy applies to the other sample, and because the two samples are related, the same or similar security policy should apply to the current sample. For example, performance module 110 may perform the security action by creating the security policy as a copy of the other security policy. Similarly, performance module 110 may base the security policy on the other security policy in proportion to the degree of relatedness between the two samples. For example, performance module 110 may modulate one or more security scores and/or adjustment values (e.g., values for adjusting security scores) in proportion to the degree of relatedness. As one illustrative example, if two samples are 50% related (according to one metric), and if one sample has a security policy of "if related to this sample, decrease security score by 10," then performance module 110 may decrease the security score for the other sample by 5, which is 50% of 10. Performance module 110 may similarly modulate the adjustment value, confidence value (e.g., confidence in a security score), and/or other security policy values using any algebraic function or business logic that factors in degree of relatedness between the samples.

In other examples, performance module 110 may simply use the designation of relatedness to perform security incident analysis and/or efficacy analysis of what security systems do and do not detect, prevent, and/or resolve. Performance module 110 may similarly use the designation of relatedness to improve security policies, bulletins, and/or malware search constraints provided to security clients such as endpoint computing systems and research departments. For example, if an earlier sample is related to a later sample, then a time span for searches for variants may be expanded to include the earlier time. Similarly, upon detecting that two samples are related, performance module 110 may warn and/or protect users or clients, who are already known to be vulnerable to one sample, such that the users or clients are similarly warned or protected from the other sample.

As explained above in connection with method 300 in FIG. 3, the disclosed systems and methods may automatically perform similarity analysis on detected samples, thereby achieving greater efficiency, accuracy, depth, and comprehensiveness in comparison to traditional manual methods. For example, the disclosed systems and methods may detect greater numbers of related samples, detect more subtle and/or distant relationships between samples, and/or avoid human error in detecting relationships and variations between samples.

Figure 6:
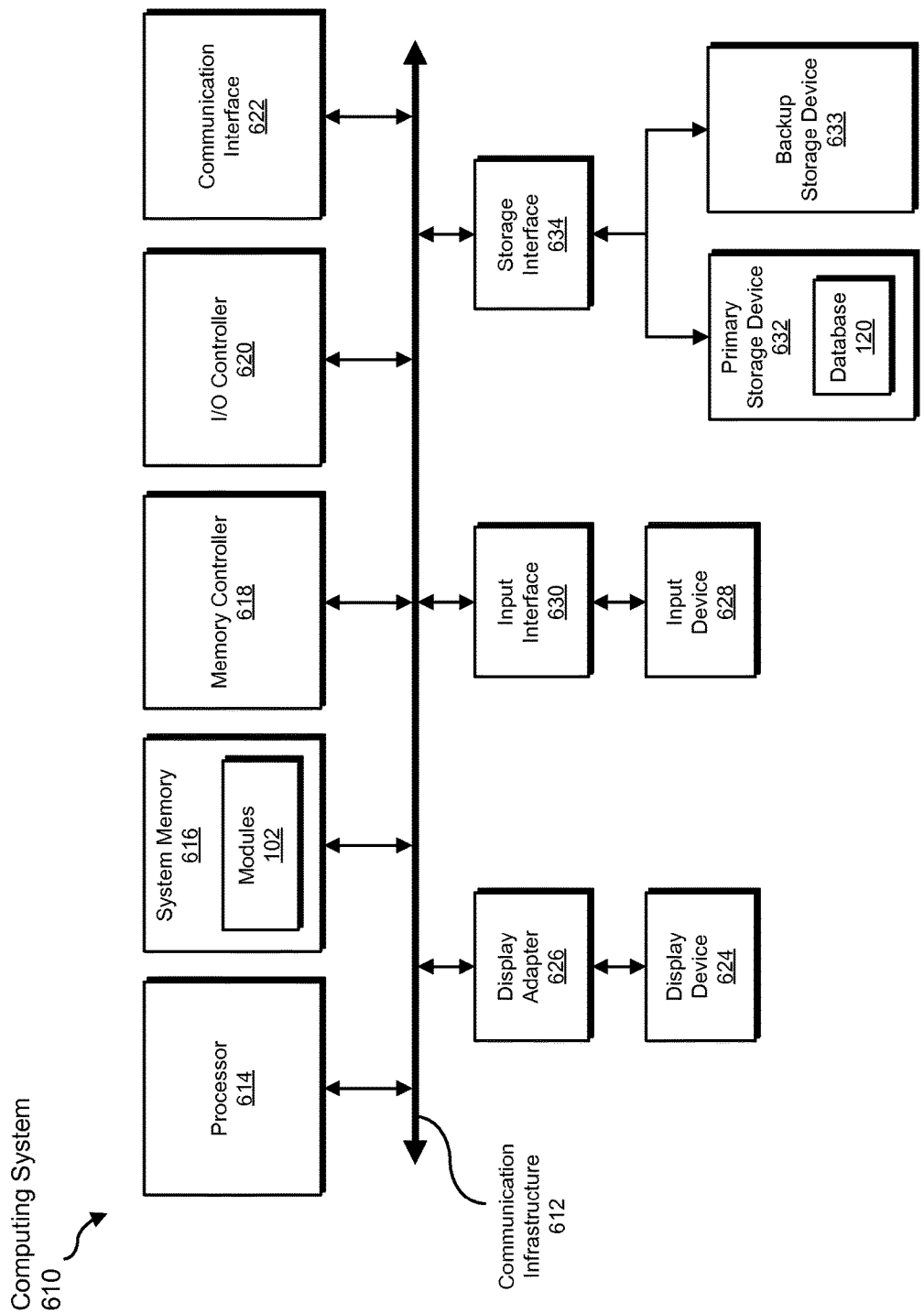
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
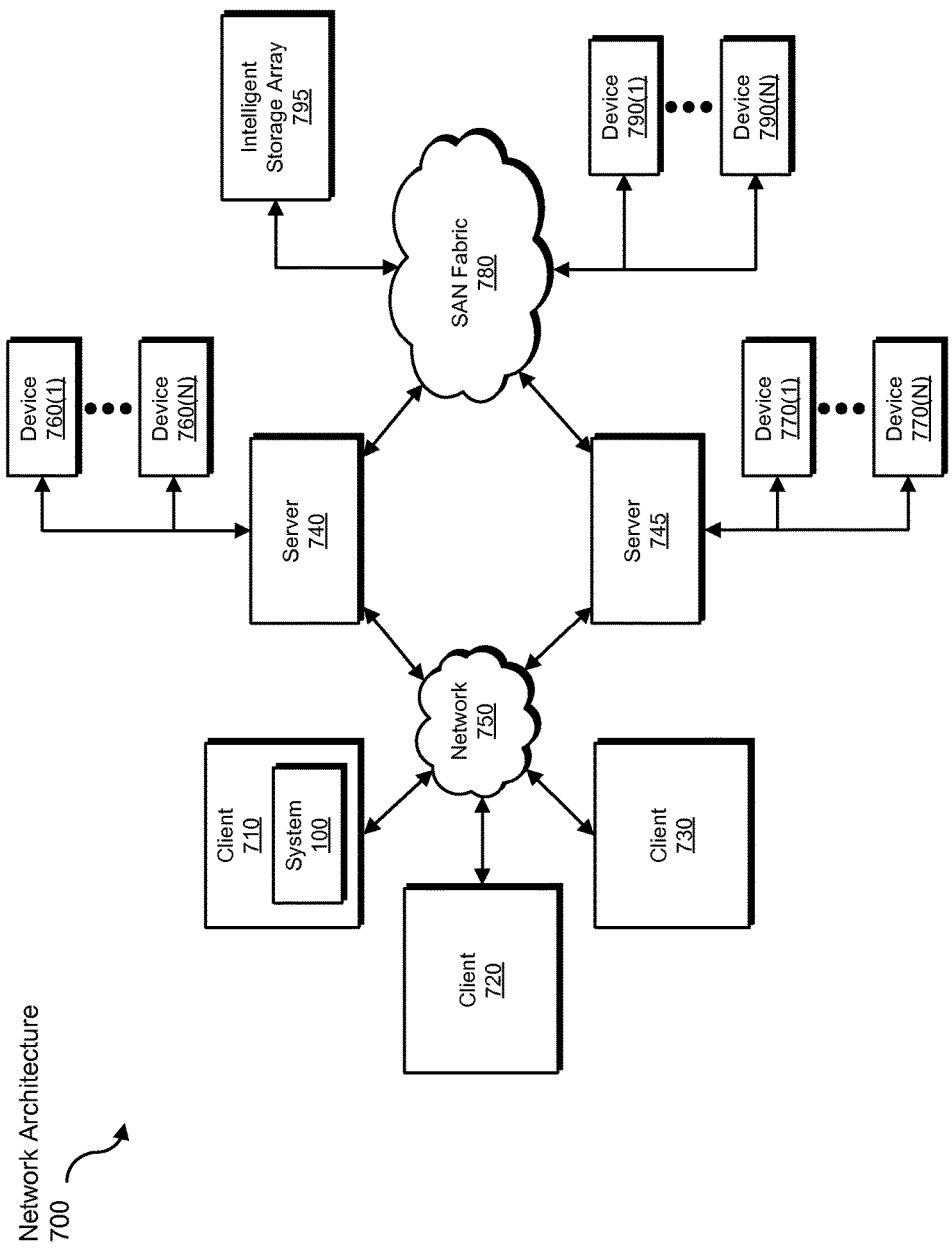
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying variants of samples based on similarity analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive metadata attributes, samples, and/or security policies to be transformed, transform any permutation of these, output a result of the transformation to a display or output device, use the result of the transformation to protect users from malware and better identify malware and malware variants, and store the result of the transformation to disk or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying variants of samples based on similarity analysis, at least a portion of the method being performed by a computing device comprising at least one processor, the method comprising:
    collecting, from security agents on endpoint computing systems, metadata attributes that describe samples identified by the security agents over an initial period of time to form a data repository;
    collecting, from the same security agents on the endpoint computing systems or different security agents on other endpoint computing systems, metadata attributes that describe a current sample identified after the initial period of time and known to comprise malware;
    comparing, for each sample within the data repository, at least two of the metadata attributes that describe the current sample known to comprise malware with corresponding metadata attributes of the respective sample iteratively in a search, within the data repository, for malware variants of the current sample known to comprise malware, wherein the two metadata attributes comprise at least two of:
        a signature name;
        a file name;
        a file path; and
        a download uniform resource locator, and the comparison detecting at least one inexact match;
    designating a sample in the data repository as a malware variant of the current sample known to comprise malware based on the comparison of the two metadata attributes during the search, within the data repository, for malware variants of the current sample known to comprise malware at least in part by determining that a degree of relatedness between the sample in the data repository and the current sample known to comprise malware satisfies a similarity threshold; and
    performing a security action to protect a user from malware based on the designation of the sample in the data repository as the malware variant of the current sample known to comprise malware such that the user is protected from malware.

2. The method of claim 1, wherein designating the sample in the data repository as the malware variant of the current sample known to comprise malware comprises designating the sample in the data repository as the closest related sample to the current sample from among the samples collected over the initial period of time.

3. The method of claim 1, wherein performing the security action comprises applying a security policy to the sample in the data repository based on another security policy assigned to the current sample known to comprise malware.

4. The method of claim 3, wherein performing the security action comprises creating the security policy as a copy of the other security policy.

5. The method of claim 1, wherein comparing the two metadata attributes comprises correlating changes in the metadata attributes with changes in time.

6. The method of claim 1, wherein collecting metadata attributes for the current sample comprises calculating a hash that uniquely identifies the current sample.

7. The method of claim 1, wherein comparing the two metadata attributes comprises iterating over the two metadata attributes to compare each metadata attribute in sequence.

8. The method of claim 7, wherein comparing each metadata attribute comprises calculating a degree of relatedness for the metadata attribute.

9. The method of claim 1, wherein designating the sample in the data repository as the malware variant of the current sample known to comprise malware comprises:
identifying an intervening sample that is directly related to the current sample known to comprise malware;
using the intervening sample as a starting point from which to identify an indirect relationship between the current sample known to comprise malware and the sample in the data repository.

10. The method of claim 9, further comprising modulating a degree of relatedness between the current sample known to comprise malware and the sample in the data repository based on a number of hops taken in identifying the indirect relationship.

11. A system for identifying variants of samples based on similarity analysis, the system comprising:
a collection module, stored in a memory, that:
collects, from security agents on endpoint computing systems, metadata attributes that describe samples identified by the security agents over an initial period of time to form a data repository; and
collects, from the same security agents on endpoint computing systems or different security agents on other endpoint computing systems, metadata attributes that describe a current sample identified after the initial period of time and known to comprise malware;
a comparison module, stored in the memory, that compares, for each sample within the data repository, at least two of the metadata attributes that describe the current sample known to comprise malware with corresponding metadata attributes of the respective sample iteratively in a search, within the data repository, for malware variants of the current sample known to comprise malware, wherein the two metadata attributes comprise at least two of:
a signature name;
a file name;
a file path; and
a download uniform resource locator,
a designation module, stored in the memory, that designates a sample in the data repository as a malware variant of the current sample known to comprise malware based on the comparison of the two metadata attributes at least in part by determining that a degree of relatedness between the sample in the data repository and the current sample known to comprise malware satisfies a similarity threshold;
a performance module, stored in the memory, that performs a security action to protect a user from malware based on the designation of the sample in the data repository as the malware variant of the current sample known to comprise malware such that the user is protected from malware; and
at least one physical processor configured to execute the collection module, the comparison module, the designation module, and the performance module.

12. The system of claim 11, wherein the designation module designates the sample in the data repository as the malware variant of the current sample known to comprise malware by designating the sample in the data repository as the closest related sample to the current sample from among the samples collected over the initial period of time.

13. The system of claim 11, wherein the performance module performs the security action by applying a security policy to the sample in the data repository based on another security policy assigned to the current sample known to comprise malware.

14. The system of claim 13, wherein the performance module creates the security policy as a copy of the other security policy.

15. The system of claim 11, wherein the comparison module compares the two metadata attributes by correlating changes in the metadata attributes with changes in time.

16. The system of claim 11, wherein the collection module collects metadata attributes for the current sample by calculating a hash that uniquely identifies the current sample.

17. The system of claim 11, wherein the comparison module compares the two metadata attributes by iterating over the two metadata attributes to compare each metadata attribute in sequence.

18. The system of claim 17, wherein the comparison module compares each metadata attribute by calculating a degree of relatedness for the metadata attribute.

19. The system of claim 18, wherein the comparison module compares the two metadata attributes by calculating an overall degree of relatedness between the current sample and the sample in the data repository based on underlying degrees of relatedness between metadata attributes.

20. A non-transitory computer-readable medium comprising one or more computer-readable instructions that, when executed by at least one processor of a computing device, cause the computing device to:
collect, from security agents on endpoint computing systems, metadata attributes that describe samples identified by the security agents over an initial period of time to form a data repository;
collect, from the same security agents on endpoint computing systems or different security agents on other endpoint computing systems, metadata attributes that describe a current sample identified after the initial period of time and known to comprise malware;
compare, for each sample within the data repository, at least two of the metadata attributes that describe the current sample known to comprise malware with corresponding metadata attributes of the respective sample iteratively in a search, within the data repository, for malware variants of the current sample known to comprise malware, wherein the two metadata attributes comprise at least two of:
a signature name;
a file name;
a file path;

and a download uniform resource locator, and the comparison detecting at least one inexact match;

designate a sample in the data repository as a malware variant of the current sample known to comprise malware based on the comparison of the two metadata attributes during the search, within the data repository, for malware variants of the current sample known to comprise malware at least in part by determining that a degree of relatedness between the sample in the data repository and the current sample known to comprise malware satisfies a similarity threshold; and perform a security action to protect a user from malware based on the designation of the sample in the data repository as the malware variant of the current sample known to comprise malware such that the user is protected from malware.

\* \* \* \* \*